(No Model.)
R. D. SCOTT.
TWO WHEELED VEHICLE.
No. 474,611. Patented May 10, 1892.
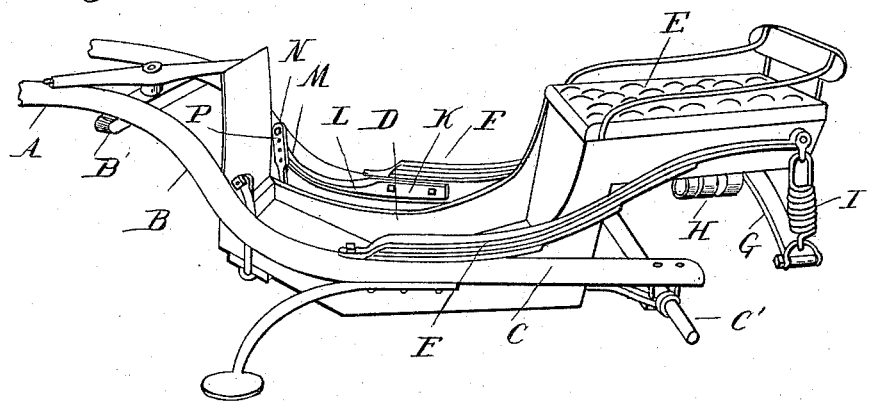
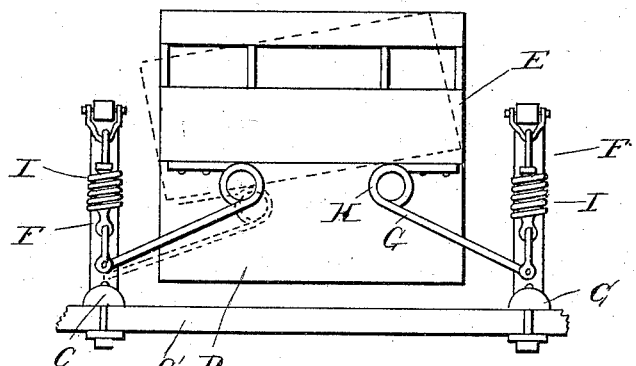
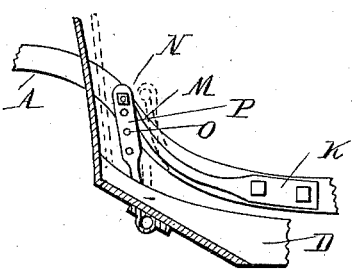
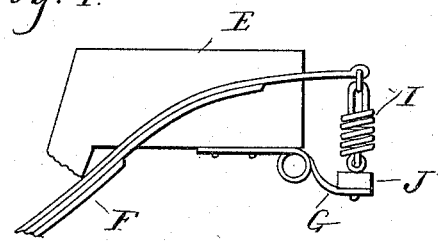
Witnesses
R. L. Nobbie
P. M. Hulbut
Inventor
Robert D. Scott
By Mr. H. Sprague Son
Attys.
THE NORRIS PETERS CO., PHOTO-LITHO., WASHINGTON, D. C.

United States Patent Office.

ROBERT D. SCOTT, OF PONTIAC, MICHIGAN.

TWO-WHEELED VEHICLE.

SPECIFICATION forming part of Letters Patent No. 474,611, dated May 10, 1892.

Application filed July 13, 1891. Serial No. 399,357. (No model.)

*To all whom it may concern:*

Be it known that I, ROBERT D. SCOTT, a citizen of the United States, residing at Pontiac, in the county of Oakland and State of Michigan, have invented certain new and useful Improvements in Two-Wheeled Vehicles, of which the following is a specification, reference being had therein to the accompanying drawings.

This invention relates to new and useful improvements in two-wheeled vehicles; and the invention consists in the peculiar construction of the support for the body whereby I overcome to as large an extent as possible the transmission from the frame to the seat of the so-called "horse motion" and the vibrations due to the inequalities in the road, producing an easy-riding vehicle.

The invention further consists in the peculiar construction, arrangement, and combination of the various parts, as more fully hereinafter described.

In the drawings, Figure 1 is a perspective view of my improved cart. Fig. 2 is a rear elevation thereof. Fig. 3 is a vertical central section through the front part of the body, showing the front link and spring. Fig. 4 is a side elevation of the rear of the body, showing a modified form of support.

A are the shafts, having a double bent portion B and a rear horizontal extension C upon a lower plane than the main portion A of said shafts.

B' is the cross-bar, and C' the axle, the whole forming the frame of a cart, these parts being of known and usual construction. The wheels I have omitted from my drawings.

D is the body of the cart, having the seat portion E; and my invention consists in the method of supporting this body and seat from the frame.

What I desire to accomplish with my invention is, first, to suspend the body from the springs and swinging links at front and rear, so that the body may be free to swing longitudinally of the frame and yet at all points to have a spring suspension which will take up the vertical movements of the frame due to the inequalities of the road; second, to suspend the body from a quarter-elliptic spring on the shaft and a torsion or coiled spring on the sides of a body, which enables me to use lighter springs, and thus give an easy-riding vehicle for light-weight persons, and yet the combined tension of the two springs is sufficient to give the heaviest occupant of the cart an easy-riding vehicle; third, in the peculiar construction of the spring-support at the front, whereby the expansion of the spring will cause the suspension-links to assume an inclined position, thereby obtaining the well-known benefit from such inclination in the links and adjusting the body only at its forward end, thereby always maintaining the same degree of tension in the springs which support the main part of the load at the rear. To this end I secure upon the horizontal extension C of the shafts at each side quarter-elliptical springs F, extending upwardly to near the rear of the body, where they connect with the arm G of the torsion-springs H, which are secured to the sides of the body, as plainly shown in Fig. 2, in such a manner that each spring will as nearly as possible sustain the load carried by half the seat.

I is a link having a spring incorporated therein, forming a spring-link and connecting the outer end of the spring F and the arm G of the spring H. With this construction at the rear the upward and downward movement of the shafts would be largely taken up by the springs F without being transmitted but to a small degree to the spring H, while the reaction of the body will largely be taken up in the spring H and its arm G. Any violent movement of either the body or the axle will be distributed between the three springs H, I, and F, the spring I tending to partially transmit all the strain from one spring to the other.

In Fig. 2 I have shown in dotted lines the effect of an unequal loading of my vehicle on one side, plainly illustrating that by this arrangement the body turns upon the pivotal point located at the point of support of the spring upon the other side of the body.

While I preferably arrange the coiled portion of the spring parallel with the length of the body, as I obtain the best results from this construction, I do not desire to limit myself to that arrangement, for it is evident that I may arrange them, as shown in Fig. 4, with a spring upon both sides, but having the arm G extending rearwardly to connect with the cross-bar J, to the end of which the spring-links I are connected.

The combination of the coil-springs on the sides of the body, together with the quarter-elliptic springs on the shafts, gives me a result which neither alone can give—that is, to produce a cart which will give soft easy-riding qualities for a light person, even a child, and yet will give the same good results with an occupant of the most unusual avoirdupois.

At the forward end I preferably support the body by means of a single leaf-spring K, secured to the side of the shaft and twisted at L to bring the leaf portion in proper position to give the necessary support to the body. This leaf portion I shape to have the vertical portions M, having eyes at their upper ends, with which bolts N engage. These bolts pass through any one of a series of apertures O in the links P, pivotally secured to the forward end of the body and preferably connected by a connecting-bar. The result of this construction is that when the occupants step into the body, while the main portion of the weight is sustained at the rear, such part of the load as is carried by the forward springs will throw the vertical portion M forwardly, as shown in Fig. 3, in full lines, thereby inclining the links P, which inclination will give me the best results in easy-riding qualities.

What I claim as my invention is—

1. In a road-cart, the combination, with the axle, the shafts secured directly to the axle, and the body, of vertically-disposed links pivotally secured to the front of the body and extending upwardly, their upper ends being formed with a series of perforations therein, springs secured to the shafts at a point between the front and rear of the body, their ends extending forwardly and upwardly and having an adjustable pivotal connection with the links, and springs for supporting the rear part of the body, substantially as described.

2. In a road-cart, the combination, with the axle, the shafts secured directly to the axle, and the body, of links secured to the body and connected at their lower ends, their upper ends being extended up beyond the base of the body, springs secured to the shafts and extending forward, their upper ends having a pivotal connection with the links, springs secured to the shafts and extending rearwardly to points adjacent to the rear of the body, links on the outer ends of said springs, and springs supporting the rear of the body, connected with the links substantially as described.

3. In a road-cart, the combination, with the shafts and body, of forwardly and upwardly extending springs on the shafts, having a vertical end portion connected with the forward portion of the body, rearwardly-extending quarter-elliptical springs on the shafts, torsion-springs on the body, and spring-link connections between the torsion-spring and quarter-elliptical springs, substantially as described.

4. In a road-cart, the combination, with the shafts having a rear horizontal extension upon a lower plane than the main portion thereof, of springs secured on said rear portion and extending rearwardly, independent coiled springs on each side of the body, a suspension device between the shaft and body springs, and means for adjusting the body vertically in relation to the shafts, substantially as described.

5. In a road-cart, the combination, with the shafts, of springs secured near the rear and extending rearwardly, independent coiled springs on each side of the body, a suspension device between the shaft and body springs, a swinging spring-support for the front of the body, and means for adjusting the body vertically in relation to the shafts, substantially as described.

In testimony whereof I affix my signature in presence of two witnesses.

ROBERT D. SCOTT.

Witnesses:
M. B. O'DOGHERTY,
A. L. HABBIE.